(12) United States Patent
Weaver

(10) Patent No.: US 6,431,810 B1
(45) Date of Patent: Aug. 13, 2002

(54) SILO RECLAIMER

(76) Inventor: Richard L. Weaver, 636 E. Lincoln Ave., Myerstown, PA (US) 17067

( * ) Notice: Subject to any disclaimer, the term of this patent is extended or adjusted under 35 U.S.C. 154(b) by 0 days.

(21) Appl. No.: 09/628,299

(22) Filed: Jul. 28, 2000

(51) Int. Cl.[7] ............................................... B65G 65/46
(52) U.S. Cl. ....................... 414/310; 198/674; 222/411; 222/412; 384/908; 384/909; 384/7
(58) Field of Search ................................. 414/310, 311, 414/312, 304, 305, 306, 307, 308, 309; 222/410, 411, 412, 413; 198/672, 673, 674, 675; 384/248, 909, 908, 7

(56) References Cited

U.S. PATENT DOCUMENTS

| | | | | |
|---|---|---|---|---|
| 3,356,235 A | * | 12/1967 | Laidig | 414/311 |
| 3,513,994 A | * | 5/1970 | DeBower et al. | 414/310 |
| 4,076,347 A | * | 2/1978 | Meek | 308/240 X |
| 4,095,703 A | * | 6/1978 | Weaver | 414/310 X |
| 4,377,364 A | * | 3/1983 | Weaver | 414/310 X |
| 4,664,036 A | * | 5/1987 | Hajcak, Jr. | 384/7 X |
| 6,062,803 A | * | 5/2000 | Christenson | 414/513 |

* cited by examiner

Primary Examiner—Frank E. Werner

(57) ABSTRACT

This invention related to a bearing for the drive ring of a ring drive of a silo reclaimer wherein the bearing is mounted on the drive ring for bearing relation with bearing surface of the ring drive and is made of a plastics bearing material. The plastics bearing material has a coefficient of friction on its bearing surface so as to operate without lubrication in use.

5 Claims, 3 Drawing Sheets

SILO RECLAIMER

This invention relates generally to a ring drive silo reclaimer. A silo reclaimer, of the type herein described, has a rotating sweep auger which travels around the silo reclaim floor pivoting from the center of the silo reclaim floor. The back support arm of the sweep auger is attached to a 360 degree drive ring located in or ont the reclaim floor a short distance from the silo wall. This drive ring advances the sweep auger 360 degrees around the reclaim floor of the silo. As it does so, it reclaims material close to the reclaim floor and conveys it radially inwardly to a center discharge hopper. The discharge hopper extends downwardly below the reclaim floor into the control room. The reclaim material is discharged therefrom by a discharge auger. Reclaimers of this design are in common use for both industry and agriculture.

BACKGROUND OF THE INVENTION

There are many types of material to be reclaimed from silos including wafer board chips, meat by-products, ground corn cobs, tree chips, organic fertilizer, bulk chemicals, gluten feed, refined sugar, hogged bark, peanut hulls, shavings, compost, sawdust, haylage, and urea. These products may be dirty, dusty, odorous, corrosive along with varying densities and varying degrees of moisture and numerous gradations of the material. It is evident that the sweep auger drive ring and the track within which it rotates are exposed to many and varied difficult operating conditions. The bearing relation between the drive ring and its track has traditionally been a metal to metal bearing of a simple rugged design. Simplicity and ruggedness are essential in silo reclaimers. The designs of the prior art require constant and heavy lubrication with oils and greases to achieve proper operation. Heavy lubrication and heavy dirt conditions are not ideal conditions and lubrication of these devices has always been a difficult and dirty job. Not only has lubrication been difficult but there have also been problems of contamination of the product being reclaimed, with there being no efficient way to remove material that filtered into the track.

This invention provides a novel rugged bearing assembly for a silo reclaimer that can be safely operated without lubrication, be largely protected from material infiltration into the drive ring track and provide an efficient means of removing any material that does infiltrate, thus prevent braking problems.

It is an object of this invention to provide a bearing assembly for a drive ring of a silo reclaimer that includes a housing to protect the bearing from the hail effects of materials in the silo that are waiting to be reclaimed.

It is a further object of this invention to provide a bearing assembly for a drive ring of a silo reclaimer that is rugged enough for silo reclaimer use.

It is a further object of this invention to provide a bearing assembly for a drive ring of a silo reclaimer that is inexpensive to build.

BRIEF SUMMARY OF THE INVENTION

With these and other objects in view, this invention provides a silo reclaimer of the type having a sweep auger; a ring drive for the sweep auger, the ring drive having a drive ring with its lower edge in bearing relation with a bearing surface mountable in or on a silo reclaim floor with the improvement of bearings on the drive ring for bearing relation with said bearing surface made of a plastics bearing material wherein the plastics bearing material has a coefficient of friction on its bearing surface to operate without lubrication in use.

BRIEF DESCRIPTION OF THE DRAWINGS

The invention will be readily understood after reference to the following detailed specification read in conjunction with the drawings.

DESCRIPTION OF THE PREFERRED EMBODIMENT

Figure 1:
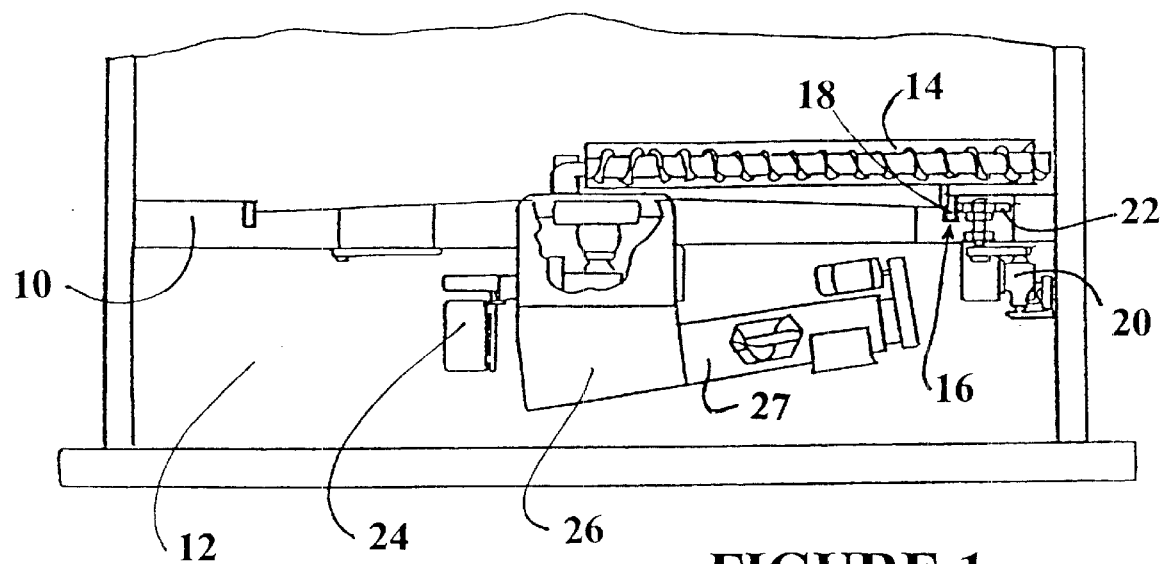
FIG. 1 is a schematic illustration of a ring drive silo reclaimer that incorporates applicant's improvements.

FIG. 1 of the drawings is a schematic illustration of a ring drive reclaimer installed in a silo which would generally have a diameter of between 12 and 80 feet. The silo has a silo reclaim floor 10 of poured concrete or bolted steel panels on which material is stored and below which is the silo control room 12. Numeral 14 refers to a sweep auger that is rotated by a sweep auger drive motor 24. The outer end of the sweep auger is supported on a support arm 18 which is in turn carried by the drive ring. The drive ring housing is generally referred to by the numeral 16. Numeral 20 refers to a ring drive advancing unit which drives the sprocket 22. Sprocket 22 operatively engages in holes 23 of the drive ring to advance the drive ring on its circular path as it carries the sweep auger 14 around the silo reclaim floor. The sweep auger 14 constantly tuns about its own longitudinal axis under the influence of the sweep auger drive motor 24, ad, as it travels and is carried around the silo reclaim floor, it sweeps materials on the silo reclaim floor towards the center and into the opening of the discharge hopper 26 for discharge by the discharge auger 27, which is located below the silo reclaim floor in the silo control room.

Figure 6:
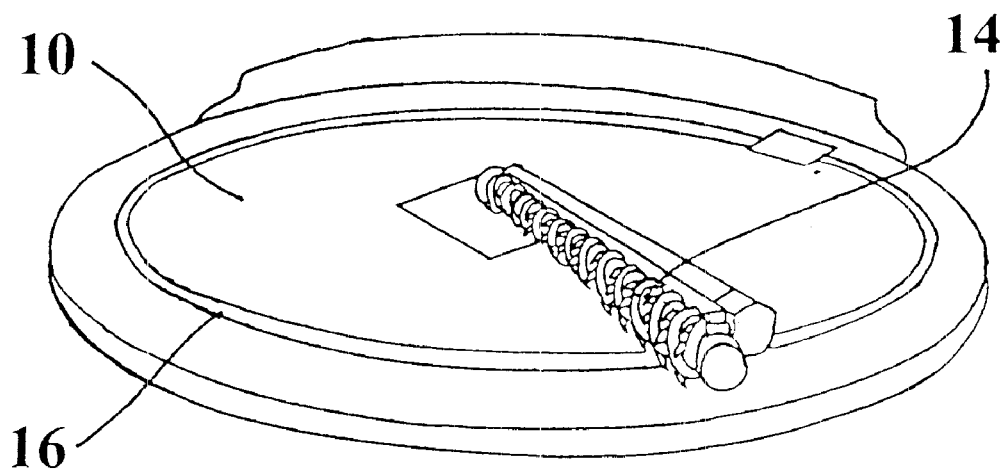
FIG. 6 is a cutaway view of the silo reclaim floor showing the pathway of the circular ring drive housing and he sweep auger.

FIG. 6 is a cutaway view showing the silo reclaim floor 10, showing the circular path along which the ring drive housing 16 extends. In operation, the sweep auger 14 is advanced along that circular path so that it is carried around the silo reclaim floor.

This general arrangement is old and in general use, It is not therefore described in detail in this specification. This invention is concerned wit the design of the drive ring drive ring bets, and the drive ring housing.

Figure 2:
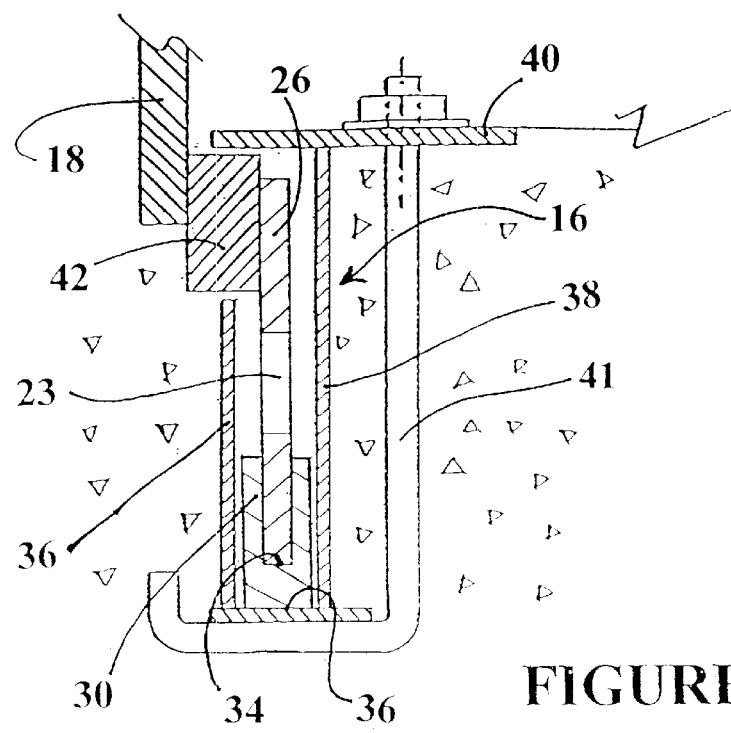
FIG. 2 is a cross sectional view on the line 2—2 of FIG. 3 showing the drive ring, the drive ring enclosure, the support for the outer end of the sweeping auger on the drive ring, and the J bolts upon which the annular hold down plate is bolted.

FIG. 1 shows little detail of the drive ring housing 16. FIG. 2 is a cross sectional illustration of the drive ring 26 and its housing generally indicated by numeral 16 in FIG. 1. The section is taken just beyond the sprocket 22 (FIG. 1). The sprocket and ring drive advancing unit 20 do not show in this view. The drive ring 26 has a continuous series of rectangular holes (FIG. 4) for drive engagement with the sprocket 22 according to standard practice. It also has a continuous series of spaced apart UHMW plastics material bearings 30 clipped onto cut outs 34 along its lower marginal portion.

Figure 4:
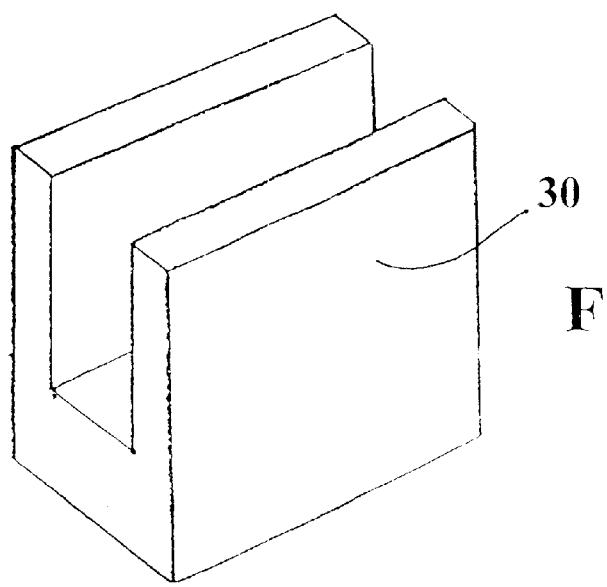
FIG. 4 is a perspective view of the drive ring bearing.
Figure 5:
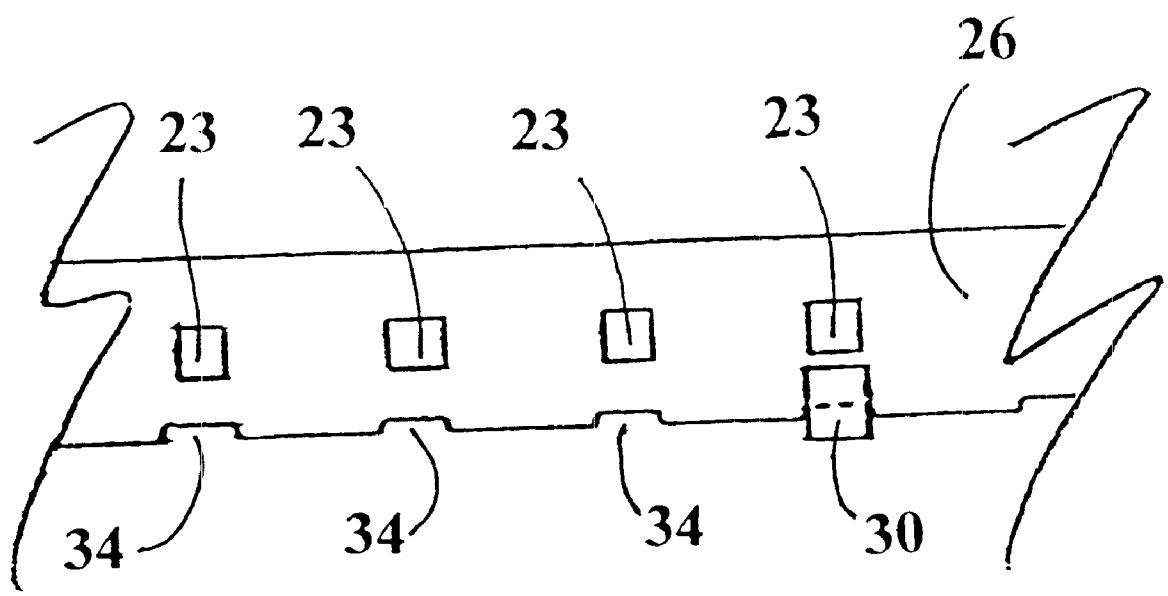
FIG. 5 is a view of a portion of the drive ring showing the square holes that are engaged by the drive sprocket and the notches on the bottom edge that retain the plastics bearings.

Drive ring 26 has cut outs 34 (FIG. 5) along its lower marginal edge portion to receive the plastics bearings 30. These bearings have a channel of a width to push over the lower marginal edge portion of the drive ring and a length to fit between the ends of the cut outs 34. When installed on the drive ring the bottom of the channel of the bearing is juxtaposed to the bottom of the slot. Thus, it will be apparent that they awe of an interlocking fit that can not become dislodged from the drive ring as the drive ring advances in use. FIG. 4 is a perspective illustration of a bearing, FIG. 5 illustrates a bearing in the fitted position on a section of the drive ring. A suitable bearing 30 used for a drive ring on a reclaimer for silos having diameters of between 12 feet and 80 feet has a length of three inches, a width of one and a half inches and a height of three inches. The bottom wall of the beating 30 has a height of one inch. The bearing surface is three inches by one and a half inches and one bearing is placed every ten inches along the drive ring.

The vertical sides of the bearing keep the drive ring centered in the drive ring housing and provide additional lubrication surface for the drive ring. The use of the bearings on the drive ring means that oil lubrication is no longer required for lubricating the movement of the drive ring within the ring drive. A further advantage of the bearing is that it can be used to sweep and collect foreign material that may filtrate into the drive ring enclosure during operation. The material is carried by the bearing pads to a discharge point (not shown) located just before the drive sprocket 22.

The drive ring enclosure comprises a bottom wall 32, an outside wall 38 and an inside wall 36 assembled by bolting and welding techniques well known in the at. Walls 36 and 38 are parallel It will be noted that there is a space between the top of wall 36 and the annular hold down cover plate 40. This space is filled with a seal bar ring 42 upon which is mounted to the back support arm 18 that carries the sweep auger 14. (FIG. 1). Seal bar ring 42 is mounted on and turns with the drive zing 26. Clearance must be provided between the seal bar ring 42 and the hold-down plate 41. This seal bar ring 42 functions to keep dirt out of he drive ring chamber. The speed of the drive ring without material in the silo can be about 5.34 ft. per min foot per minute for a drive ring operating in a silo that is 60 feet in diameter. The advancing of the drive ring when reclaiming material from the silo is variable depending on the density of the material and the reclaim rate required by the operator. It will stop and start and is also built with an A.C. invertor drive unit which varies the speed to match the reclaim rate required.

The plastics material of the bearings is preferably an ultra high molecular weight plastics material. This material is presently generally commercially known as UHMW. Its coefficient of friction on the steel bottom of the housing is such that it can operate without oil lubrication in use. A UHMW plastic material sold under the trade name TIVAR 1000 by Menasha Corporation is satisfactory.

Figure 3:
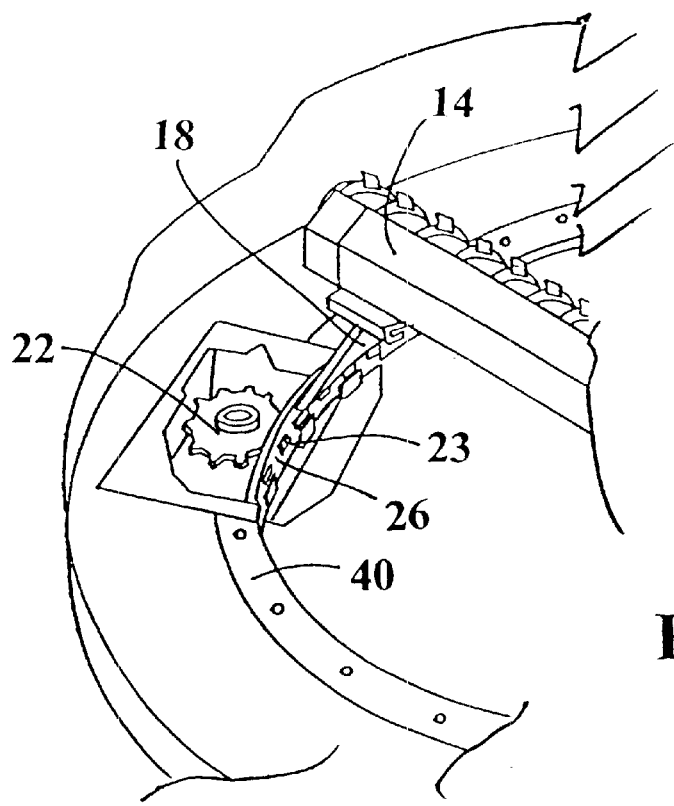
FIG. 3 is a schematic illustration of the ring drive assembly with cover plate removed.

The track enclosure for the drive ring is embedded in or on top of the concrete floor. A space in the concrete is formed to house the ring drive advancing units 20 as illustrated in FIG. 3. This view shows the sprocket 22 of the unit engaging in the sprocket holes 23 of the drive ring 26. Access to the drive ring for cleaning and inspection can be gained at locations where openings in the concrete floor are made to house a ring drive assembly. Removal of the hold down plate 40 which is secured by the J bars also gives access to the drive ring. This hold down plate is annular and fabricated in sections. It forms the top wall of the drive ring housing.

A ring drive silo reclaimer equipped with plastic bearings according to this invention achieves all the objectives of the invention.

It is not intended that the disclosure be read in a limiting sense. The embodiment illustrated and described is the preferred embodiment. Variations from this embodiment are possible without varying from the scope of the invention, which is as defined in the appended claims.

I claim:

1. In a silo reclaimer having a sweep auger; a ring drive for the sweep auger, the ring drive having a drive ring with sides and a lower edge and a lower marginal portion adjacent the lower edge, the lower edge being in bearing relation with a bearing surface mountable within a drive ring enclosure formed within a silo reclaim floor and comprising two concentric side walls and a bottom wall, the bottom wall being a bearing surface and there being a ring drive advancing means operatively connected to the drive ring to advance the drive ring within the drive ring enclosure of the silo reclaim floor, the improvement of:

forming the drive ring with spaced apart cut outs along the marginal portion of the lower edge of the drive ring;

bearings on said drive ring for bearing relation with said bearing surface made of a plastics bearing material, said bearings being of a length to enter said cut outs and longitudinally grooved on their upper surface to embrace the sides of the drive ring at said cut outs to mount the bearings on said drive ring;

said plastics bearing material having a coefficient of friction on said bearing surface to operate without lubrication in use.

2. The silo reclaimer having a sweep auger as claimed in claim 1 in which said plastics bearing material is an ultra high molecular weight plastics material.

3. The silo reclaimer having a sweep auger as claimed in claim 2 in which one of said concentric side walls has a circumferentially extending opening; and which has a seal bar mounting ring for the sweep auger on the drive ring, the mounting ring extending through the circumferentially extending opening and being of a size to close the opening to prevent infiltration of material during silo reclaim operation.

4. The silo reclaimer having a sweep auger as claimed in claim 1 in which one of said concentric side walls has a circumferentially extending opening; and which has a seal bar mounting ring for the sweep auger on the drive ring, the mounting ring extending through the circumferentially extending opening and being of a size to close the opening to prevent infiltration of material during silo reclaim operation.

5. The silo reclaimer having a sweep auger as claimed in claim 4 in which said plastics bearing material is an ultra high molecular weight plastics material.

* * * * *